UNITED STATES PATENT OFFICE.

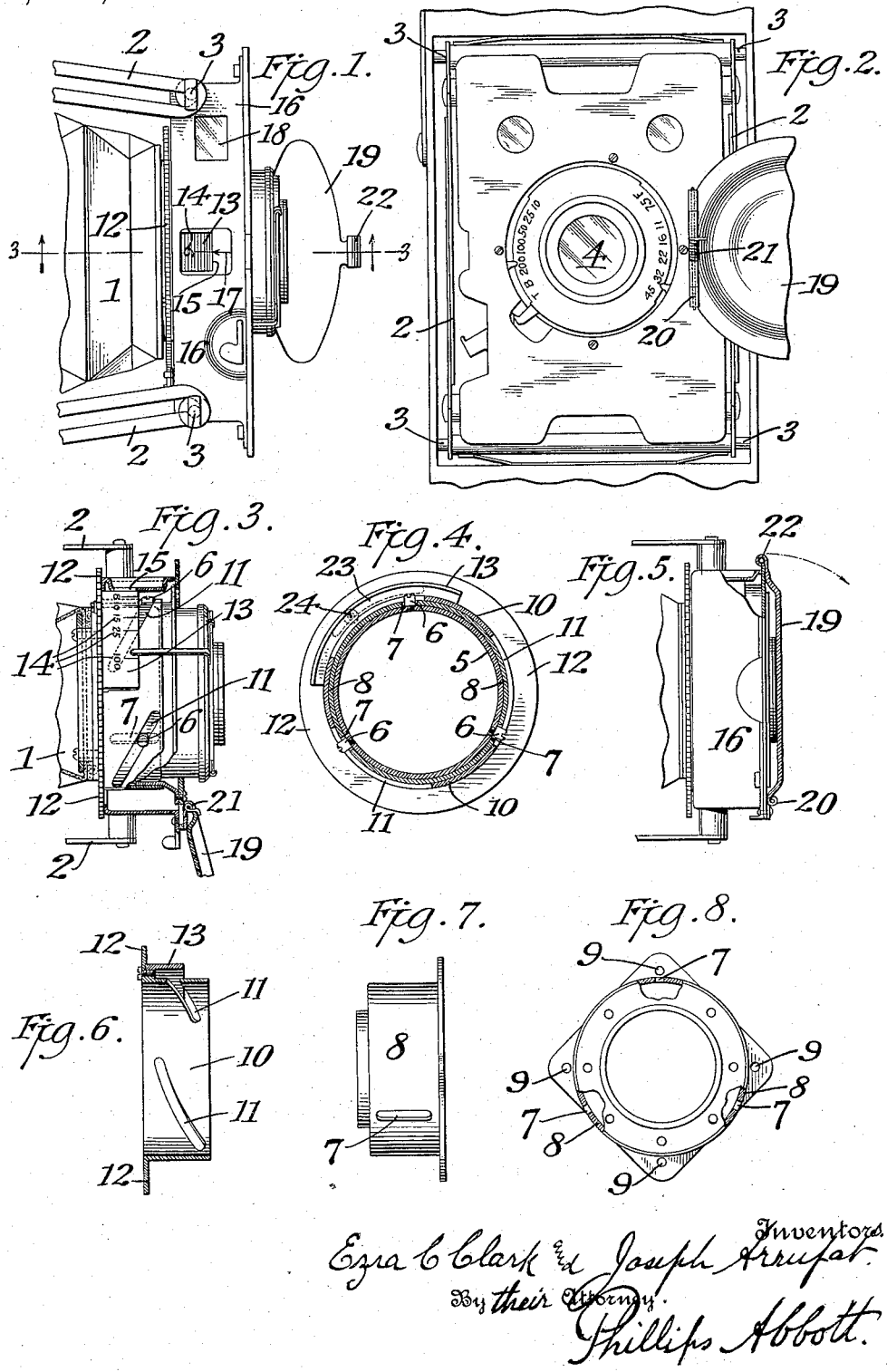

EZRA C. CLARK AND JOSEPH ARRUFAT, OF BINGHAMTON, NEW YORK, ASSIGNORS TO ANSCO COMPANY, OF BINGHAMTON, NEW YORK, A CORPORATION OF NEW YORK.

FOCUSING DEVICE FOR CAMERAS.

1,174,014.      Specification of Letters Patent.      Patented Feb. 29, 1916.

Application filed March 13, 1915. Serial No. 14,084.

*To all whom it may concern:*

Be it known that we, EZRA C. CLARK and JOSEPH ARRUFAT, both citizens of the United States, and residents of the city of Binghamton, county of Broome, and State of New York, have invented a new and useful Improvement in Focusing Devices for Cameras, of which the following is a specification.

It is the purpose of our invention to provide compact, easily operated and easily read focusing devices for cameras, whereby the lens may be projected or retracted as required in a more convenient and satisfactory manner than heretofore, and the construction and arrangement of the parts are such that a series of advantages is secured, among them the following: Since the finder and the lens-adjusting, in other words, the focusing devices, are in close juxtaposition and both directly in view of the operator, he can read the distance indices for the adjustment of the lens and also observe the picture in the finder without changing the position of the camera and in a more convenient manner than heretofore. Also the indices which determine the proper position of the lens, to wit, stationary pointer and revolving scale, are at all times the same distance from the focal plane, thus no part has to be moved except the lens tube itself which is automatically moved by proper manipulation of the parts. Also the devices which secure the necessary adjustment of the lens are in rear of the shutter box or casing where it is more convenient than heretofore and removes the operator's hand from in front of the finder lens which at all times is inconvenient and at times obstructs the finder lens. Also the construction is such that the forwardly presented surface of the movable lens and lens supporting frame is smoother and has less projecting parts than any other construction, so that the liability that the clothing of the operator, or other passing objects shall catch thereon and disturb or perhaps upset and thus injure the camera, is reduced.

Referring to the drawings Figure 1 is a sidewise elevation of the movable front frame and associated parts of a camera embodying our invention; Fig. 2 is a front elevation of that which is shown in Fig. 1; Fig. 3 is a longitudinal horizontal section on the line 3—3 of Fig. 1, certain of the parts being shown in elevation; Fig. 4 is a front view, partly in section, of the three concentric tubes or rings whereby the inward and outward movement of the lens is effected and showing the index plate in elevation; Fig. 5 is a sidewise view, partly broken away, showing the relation of the several parts to the casing which contains the lens, also showing an exterior cover for the protection of the lens; Fig. 6 is an edgewise sectional view of the movable slotted ring to which the actuating plate and index are attached; Fig. 7 is an edgewise elevation of the intermediate ring slotted to secure longitudinal movement of the lens-carrying tube; Fig. 8 is a rear elevation, the parts being broken away, of the parts shown in Fig. 7.

Referring to the drawings 1 represents the bellows, 2 the extension arms for supporting the movable front and co-acting parts when extended, 3 are trunnions or supports for the forward end of the extension arms, 4 is the lens.

Referring now more particularly to Figs. 4 to 8, 5 is the inner or lens-carrying tube or ring in which are rigidly fastened pins or screws 6, shown as screws in the present instance. They pass through slots 7 made in the intermediate ring 8. These slots extend longitudinally, as shown best in Fig. 7, for the purpose of compelling the lens tube to move in right lines longitudinally of the camera. The ring 8 is stationary, being held in position by the screws or equivalent members passing through holes 9 made in the projecting flange or plate of the ring. 10 is the outer and reciprocatingly movable ring, which makes partial rotation about the intermediate fixed ring 8. It is provided with diagonally arranged slots 11 (see Fig. 6) through which the outer parts of the screws or pins 6 work. The ring 10 is preferably provided on its rear edge with a radially extending flange 12, which as shown in Fig. 4, extends entirely around the ring 10, but it need not be continuous if otherwise preferred, and its outer edge is preferably knurled or roughened as shown best in Fig. 3, so as to afford good finger grip. To this flange is attached a horizontally extending plate 13, which is preferably curved to conform to the contour of the ring 10 and upon this plate are made the distance designations 14 (see Figs. 1 and 3). These designations are visible through the opening 15 made in the plate 16 of the lens casing, which plate is provided with a fixed pointer 17 (see Fig. 1). The finder openings 18, one only being shown, may also be conveniently made in this plate 16 of the lens casing. To cover and protect the lens we provide the cover 19, which is pivoted at 20 to some appropriate part of the lens-carrying frame and provided with a spring 21 (see Fig. 2) about its axis, whereby it will normally be held opened, so that wind drafts and other movements will not close the cover inopportunely, and with a suitable catch 22 (see Figs. 1 and 5) whereby it will be held when closed.

Referring more particularly to Fig. 4 the flange 12 on the outer ring 10 is provided with a slot 23 and set screw 24, whereby lens differentiation may be compensated for at the time of the initial assemblage of the camera in a manner well understood.

The operation is as follows: The lens frame being extended through the instrumentality of the extension arms in a manner well known, the operator determines the distance between the camera and the object to be photographed and thereupon, by simply turning the outer ring 10 through the instrumentality of its radially extending flange 12 and observing the distance designations upon the index plate 13, brings the appropriate designation or some intermediate point between the designations into proper registration with the fixed pointer 17, and it will be noted that while so doing, he may with the greatest ease, observe the image in the finder because its observation plate is closely adjacent to the distance indicator referred to and both have the same upward presentation most convenient for the operator to observe them both. The lens cover 19 being now opened the exposure will be made in the usual manner. Also the following advantages will be noted. The revolving disk and indicator are both in rear of the shutter casing in a position most convenient for the operator and particularly that the operator's hand, while manipulating the lens focusing devices, will be removed from the front of the camera and therefore will not obstruct the finder, and lastly it will be noted that the construction is such that all surfaces of the movable front or lens and bellows supporting frame, are relatively smooth or free from projecting parts, which are or might be liable to catch upon the clothing of the operator or upon other passing objects.

It will be obvious to those who are familiar with this art that modification may be made in the details of construction of the parts above described and illustrated and yet the essentials of the invention be retained. We therefore do not limit ourselves to the details described and illustrated.

We claim—

1. A focusing device for cameras comprising a diagonally slotted rotatable ring having a flange accessible from the exterior of the apparatus whereby the ring may be rotated, an index plate carried by the ring, designations on the plate, a fixed pointer coacting with said designations, an inner longitudinally movable lens bearing tube, an intermediate fixed and longitudinally slotted ring, and pins rigidly connected to the inner tube and which project through the longitudinal slots in the intermediate tube and slidably engage in the diagonal slots of the outer ring.

2. The combination in a camera of a finder and focusing devices located in rear of the finder, comprising a diagonally slotted rotatable ring having a flange accessible from the exterior of the apparatus, whereby the ring may be rotated, an index plate carried by the ring, designations on the plate, a fixed pointer, an inner longitudinally movable lens bearing tube, and means connecting the tube with the ring, whereby the tube may be longitudinally moved by rotating the ring in rear of the finder.

3. The combination in a camera of a finder and focusing devices located in rear of the finder comprising a diagonally slotted rotatable ring having a flange accessible from the exterior of the apparatus, whereby the ring may be rotated, an index plate carried by the ring, designations on the plate observable through the opening in the lens casing, the said opening and the observation window of the finder being adjacent to each other and having the same upward presentation, a fixed pointer, an inner longitudinally movable lens-bearing tube and means connecting the tube with the ring whereby the tube may be longitudinally moved by rotating the ring.

In witness whereof we have signed our names to this specification in the presence of two subscribing witnesses.

EZRA C. CLARK.
JOSEPH ARRUFAT.

Witnesses:
HENRY F. MEEHAN,
CARL BORNMANN.